(12) United States Patent
Matsuoka

(10) Patent No.: US 6,540,406 B1
(45) Date of Patent: Apr. 1, 2003

(54) DOUBLE ROW BEARING

(75) Inventor: Hideki Matsuoka, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/707,321

(22) Filed: Nov. 7, 2000

(30) Foreign Application Priority Data

Nov. 19, 1999 (JP) .......................................... 11-328980

(51) Int. Cl.⁷ ............................................. F16C 33/66
(52) U.S. Cl. ..................................................... 384/517
(58) Field of Search ................... 384/517, 535, 384/536

(56) References Cited

U.S. PATENT DOCUMENTS

| | | | | |
|---|---|---|---|---|
| 1,399,959 A | * | 12/1921 | Hanson ...................... | 384/517 |
| 1,448,189 A | * | 3/1923 | Brunner ...................... | 384/611 |
| 2,433,518 A | * | 12/1947 | Ljunggren .................. | 384/517 |
| 3,804,562 A | * | 4/1974 | Hansson ..................... | 384/517 |
| 3,900,232 A | * | 8/1975 | Rode ....................... | 29/898.09 |
| 4,227,755 A | * | 10/1980 | Lundberg .................... | 384/101 |
| 4,325,590 A | * | 4/1982 | Pethis ....................... | 384/518 |
| 4,363,615 A | * | 12/1982 | Bolender ..................... | 425/363 |
| 4,699,528 A | * | 10/1987 | Gotman ....................... | 384/536 |
| 4,719,352 A | * | 1/1988 | Miyatake et al. ........... | 250/343 |
| 4,724,943 A | * | 2/1988 | Harrington et al. ..... | 192/110 B |
| 4,732,495 A | * | 3/1988 | Brandenstein et al. ...... | 384/518 |
| 4,913,564 A | * | 4/1990 | Stephan et al. ............ | 384/511 |
| 4,958,945 A | * | 9/1990 | Nakanishi .................... | 384/512 |
| 5,000,589 A | * | 3/1991 | Ogata et al. ................. | 384/517 |
| 5,030,016 A | * | 7/1991 | Schoeffter ................ | 29/898.09 |
| 5,316,393 A | * | 5/1994 | Daugherty ................... | 384/517 |
| 5,571,004 A | * | 11/1996 | Masters et al. ............. | 418/107 |
| 5,624,193 A | * | 4/1997 | Vogelsberger et al. ...... | 267/163 |
| 6,000,855 A | * | 12/1999 | Miyazaki ..................... | 384/517 |
| 6,010,247 A | * | 1/2000 | Mouri et al. ................. | 384/501 |
| 6,032,336 A | * | 3/2000 | Fujiwara ..................... | 19/236 |
| 6,158,898 A | * | 12/2000 | Jeng et al. ................... | 384/518 |
| 6,227,714 B1 | * | 5/2001 | Obara ........................ | 384/512 |

* cited by examiner

Primary Examiner—Jack Lavinder
Assistant Examiner—Benjamin A Pezzlo
(74) Attorney, Agent, or Firm—Frishauf, Holtz, Goodman & Chick, P.C.

(57) ABSTRACT

A double row bearing includes a shaft and an inner ring mounted on the shaft. A preloading collar is fixedly mounted on the shaft and an elastic member is disposed between the inner ring and the preloading collar so that the preloading collar applies a predetermined preload to the inner ring through the elastic member. This structure compensates the reduction of the preload due to the temperature rise of the bearing and axial displacement of the inner ring of the bearing.

12 Claims, 5 Drawing Sheets

DOUBLE ROW BEARING

BACKGROUND OF THE INVENTION

1. Field of the Invention

The present invention relates to a double row bearing, and more particularly to a dual row bearing used for a spindle motor for a precision instrument.

2. Description of the Related Art

As shown in FIG. 1, a conventional dual row bearing as one of the double row bearings includes a shaft 101, a pair of inner rings 102 and 103 disposed in an axially separated manner from each other on the shaft 101, a pair of outer rings 104 and 105 coaxially surrounding the inner rings 102 and 103, two rows of balls 110 and 111 arranged circumferentially on the raceway surfaces 106 and 107 formed in the outer surfaces of the inner rings 102 and 103 and the raceway surfaces 108 and 109 formed in the inner surfaces of the outer rings 104 and 105. A circular spacer 112 is provided between the outer rings 104 and 105 in the conventional dual row bearing. Annular grooves 113 are formed in those portions of the shaft 101 which correspond to the inner surfaces of the inner rings 102 and 103. After the annular grooves 113 have been filled with adhesive, a predetermined preload is applied from one of the inner rings 102 and 103 (in FIG. 1, the left side inner ring 102) towards the other of the inner rings 102 and 103 (in FIG. 1, the right side inner ring 103) and the inner rings 102 and 103 are bonded to the shaft 101.

When the inner rings 102 and 103, the outer rings 104 and 105 and the balls 110 and 111 are made of bearing steel, the outer rings 104 and 105 expand more largely than the inner rings 102 and 103 as the temperature of the dual row bearing mounted on a component of a machine or an instrument is raised, since the inner diameter of the outer rings 104 and 105 is larger than the outer diameter of the inner rings 102 and 103. Thus, the radial space between the outer surfaces of the inner rings 102 and 103 and the inner surfaces of the outer rings 104 and 105 increases due to the temperature rise of the bearing.

Since the balls 110 and 111 between the inner rings 102 and 103 and the outer rings 104 and 105 have much smaller diameters than the outer diameter of the inner rings 102 and 103 and the inner diameters of the outer rings 104 and 105, the increase of the diameter of the balls 110 and 111 is less than the increased distance between the outer surfaces of the inner rings 102 and 103 and the inner surfaces of the outer rings 104 and 105 caused by elevation of the temperature.

This reduces the pushing forces between the balls 110 and the raceway surface 106 of the inner ring 102 and the raceway surface 108 of the outer ring 104 and between the balls 111 and the raceway surface 107 of the inner ring 103 and the raceway surface 109 of the outer ring 105, or, in some cases, the balls 110 and 111 are separated from the raceway surfaces 106 and 107 and/or the raceway surfaces 108 and 109.

When the pushing forces are lowered, the preload of the bearing is remarkably reduced. Or, when the balls 110 and 111 are separated from the raceway surfaces 106 and/or 108 and/or 107 and/or 109, the preload is diminished and the bearing cannot function well.

Since the bearing of this type is very small, its heat capacity is very small. Thus, when this bearing is used in a spindle motor, the bearing is much influenced by heat generated due to the electric consumption power of the coil of the spindle motor, heat generated in the bearing by friction or the like and/or by heat from an external heat source.

The raceway surfaces 106 and 107 of the inner rings 102 and 103 are finished extremely accurately. However, when bonded to the shaft 101, the inner rings 102 and 103 are deformed and sometimes their dimensional accuracy is deteriorated. For instance, the roundness of the raceway surface of the inner rings 102 and 103 sometimes changes from 0.1 $\mu$m at the finished state to 0.5 $\mu$m to 1 $\mu$m or more in a bonded state to the shaft 101. Further, when the inner rings 102 and 103 are bonded to the shaft 101 in an inclined state, the inclination cannot be corrected. This deteriorates the assembly accuracy of the bearing.

Further, this bearing is of a radial type. Thus, when a load which causes an axial relative movement between the shaft 101 and the outer rings 104 and 105 and particularly when such axial relative movements are repeated, it is not desirable to use such bearing.

SUMMARY OF THE INVENTION

An object of the present invention is to provide a double row bearing in which a preload does not change quickly even if the temperature of the bearing changes whereby the bearing keeps a high performance characteristic.

Another object of the present invention is to provide a double row bearings having high assembly accuracy.

A further object of the present invention is to provide a double row bearing which has a long service life and which can be used stably even if it is in a condition in which an axial load is applied to the bearing.

In order to achieve the objects of the present invention, there is provided a double row bearing which has a shaft, outer ring means coaxially surrounding the shaft and relatively rotatable therearound. The outer ring means has one end portion and the other end portion.

A first annular raceway surface is formed in the inner peripheral surface in said one end portion of the outer ring means, and an annular inner ring surrounds the shaft between the shaft and said one portion of the outer ring means. A second annular raceway surface is formed in the outer peripheral surface of the inner ring so as to radially face the raceway surface. A row of balls are received by the first and second raceway surfaces and arranged circumferentially thereof.

A preloading member is mounted on the shaft at the end of said one end portion of the outer ring means, and elastic means is provided between the inner ring and the preloading member. The preloading member is fixed to the shaft in a position in which the preloading member presses the elastic means towards the inner ring to apply a predetermined preload to the inner ring through the elastic means.

The elastic means can comprise at least one belleville spring.

Alternatively, the elastic means can comprise at least one gear-shaped spring having tooth sections inclined towards the inner ring.

Alternatively, the elastic means is made of elastic rubber.

A space can be formed between the end of said one end portion of the outer ring means and said one end of the inner ring so that at least a part of the preloading member enters the space. The preloading member can be bonded to said shaft.

An annular groove filled with adhesive is formed in the outer peripheral surface of the shaft. Axial slots filled with adhesive can be formed in the area of the outer peripheral surface of the shaft at an end portion of the shaft and arranged so as to be separated circumferentially of the shaft.

It is preferred that the shaft comprises a first cylindrical shaft portion inserted into the inner ring and a second cylindrical shaft portion formed integrally and coaxially with the first shaft portion and having an outer diameter substantially equal to the diameter of the inner peripheral surface of the other end portion of the outer ring means, wherein a third annular raceway surface is formed in the inner peripheral surface of the other portion of the outer peripheral surface of the outer ring means, a fourth annular raceway surface is formed in the outer peripheral surface of the second shaft portion so as to radially face the third annular raceway surface, and another row of balls are disposed between the other portion of the outer ring means and the second shaft portion so as to be received by the third and fourth annular raceway surfaces arranged circumferentially thereof.

Preferably, a first outer ring is formed by said one end portion of the outer ring means and a second outer ring is formed by the other end portion of said outer ring. In this case, a sleeve-shaped spacer surrounds the shaft and is disposed between the first and second outer rings in an abutment state thereagainst.

Another elastic means can be provided between one end of the second shaft portion and the other end of said inner ring, for applying another urging force to said inner ring, wherein the preloading member is fixed to the first shaft portion in a position in which the predetermined preload is substantially equal to the urging force applied by the first-mentioned elastic means to the inner ring minus said another urging force applied by said another elastic means to the inner ring.

Alternatively, said one end portion of the outer ring means can comprise a first outer ring, and the other end portion of the outer ring means can comprise a second outer ring wherein a sleeve-shaped spacer surrounds the shaft and is disposed between the first and second outer rings so as to abut thereagainst.

The outer ring means can comprise a single integral sleeve-shaped member.

The inner ring can be made narrower than the first outer ring.

It is preferred that one end portion of the outer ring means comprises a first outer ring which the row of balls engage and that the other portion of the outer ring means than said one end portion thereof comprises a second outer ring coaxially surrounding the shaft and abutting against the first outer ring.

It is also preferred that the double row bearing can be constructed such that a first inner race is formed by the inner race, the outer ring means comprises a first outer ring formed by the end portion of the outer ring means and coaxially surrounding the first inner ring and a second outer ring formed by the other end portion of the outer ring means. In this case, an annular spacer surrounds the shaft and is disposed between the first and second outer rings in an abutment state thereagainst. A second inner ring is mounted on the shaft and provided between the shaft and the second outer race. An annular raceway surface is formed in the inner peripheral surface of the second outer ring and another annular raceway surface is formed in the outer peripheral surface of the second inner ring so as to radially face the annular raceway surface of the second outer ring. Further, a row of rollable balls are disposed between the second outer ring and the second inner ring and received by the raceway surfaces of the second outer ring and the second inner ring so as to rotate circumferentially thereof.

Preferably, the double row bearing is used for a spindle motor.

DETAILED DESCRIPTION OF THE PREFERRED EMBODIMENTS

The present invention will be described in detail by way of the preferred embodiments with reference to the accompanying drawings.

Figure 2:
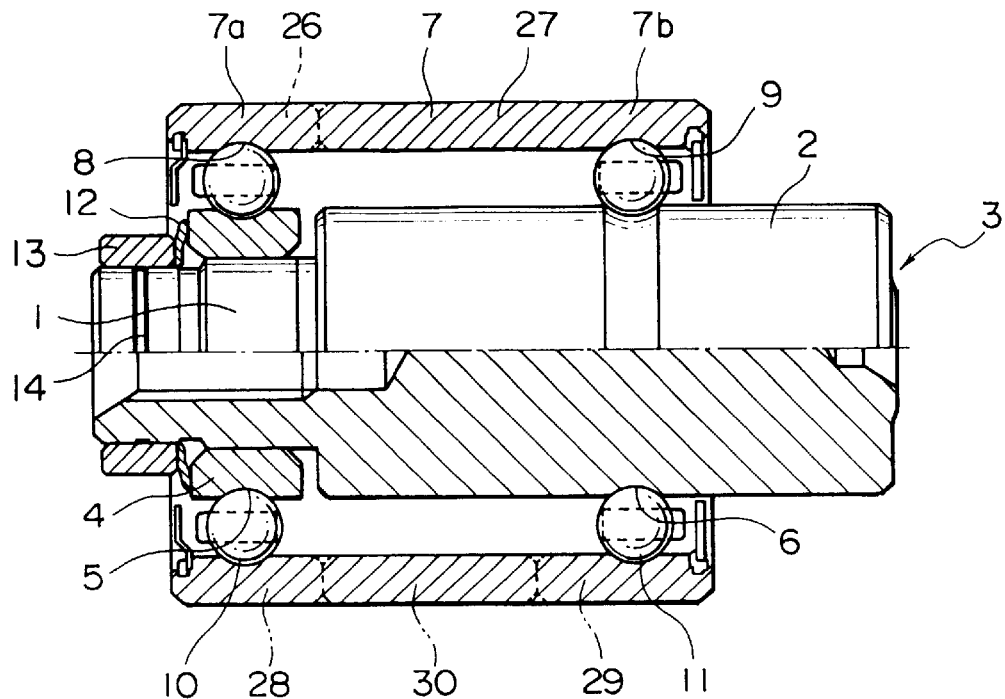
FIG. 2 is an axial cross sectional view of an embodiment of a double row bearing with elastic means and a preloading collar.

FIG. 2 is an axial cross sectional view of an embodiment of a double row bearing according to the present invention.

The double row bearing has a shaft 3 which comprises a first cylindrical shaft portion 1 and a second cylindrical shaft portion 2 formed integral with the first cylindrical shaft portion 1 and coaxially aligned therewith. The second cylindrical shaft portion 2 has a larger outer diameter than that of the first cylindrical shaft portion 1.

On the smaller first cylindrical shaft portion 1 is mounted an annular inner ring 4 having substantially the same outer diameter as the outer diameter of the larger cylindrical shaft potion 2 in such a manner that the inner ring 4 is slidable along the first cylindrical shaft portion 1 but irrotational with respect thereto. In the central portion of the outer peripheral surface of the inner ring 4 is formed an annular raceway surface (second raceway surface) 5 having a substantially semi-circular cross section. In the outer peripheral surface of that end portion of the second cylindrical shaft portion 2 which is opposite to the first cylindrical shaft portion 1 is formed an annular raceway surface (fourth raceway surface) 6 having substantially the same shape and substantially the same dimensions as those of the second raceway surface 5.

A cylindrical sleeve-shaped outer ring 7 coaxially surrounds the shaft 3 with a predetermined radial space provided between the outer peripheral surface of the shaft 3 and the inner peripheral surface of the outer ring 7. In those inner peripheral surfaces of both end portions 7a and 7b of the outer ring 7 which radially face the second raceway surface 5 and the fourth raceway surfaces 6, respectively, are formed an annular raceway surface (first raceway surface) 8 and an annular raceway surface (third raceway surface) 9 which have substantially the same shape and dimensions as those of the second and fourth raceway surfaces 5 and 6. A row of rollable balls 10 are received by the first and second raceway surfaces 8 and 5 and arranged circumferentially. Likewise, another row of rollable balls 11 are engaged with the third and fourth raceway surfaces 9 and 6 and arranged circumferentially thereof.

Elastic means 12 is provided so as to abut against the end face (hereinafter referred to as "the free end face") of the inner ring 4 which is at the opposite side of the second cylindrical shaft portion 2. An annular preloading member (hereinafter referred to as "the preloading collar") 13 is slidably mounted on the first cylindrical shaft portion 1 from the end (hereinafter referred to as "the free end") of the first cylindrical shaft portion 1 which is at the opposite side of the second cylindrical shaft portion 2. The preloading collar 13 pushes the elastic means 12 towards the second cylindrical shaft portion 2 and is fixed to the first cylindrical shaft portion 1 when the elastic means 12 applies a predetermined preload to the inner ring 4. In this way, a predetermined pressure is applied to the bearing.

An annular groove 14 is formed in the substantially middle portion of the area of the outer peripheral surface of the first cylindrical shaft portion 1 on which the preloading collar 13 is to be fixedly mounted. After the annular groove 14 has been filled with acryl anaerobic adhesive, the preloading collar 13 is brought to this area and bonded to the first cylindrical shaft portion 1. The adhesive spreads over the whole inner peripheral surface of the preloading collar 13 and then the preloading collar 13 is firmly bonded to the first cylindrical shaft portion 1 over the whole inner peripheral surface of the preloading collar 13. Further, since the adhesive is formed thick, strong bonding of the preloading collar 13 to the first cylindrical shaft portion 1 is ensured.

Figure 1:
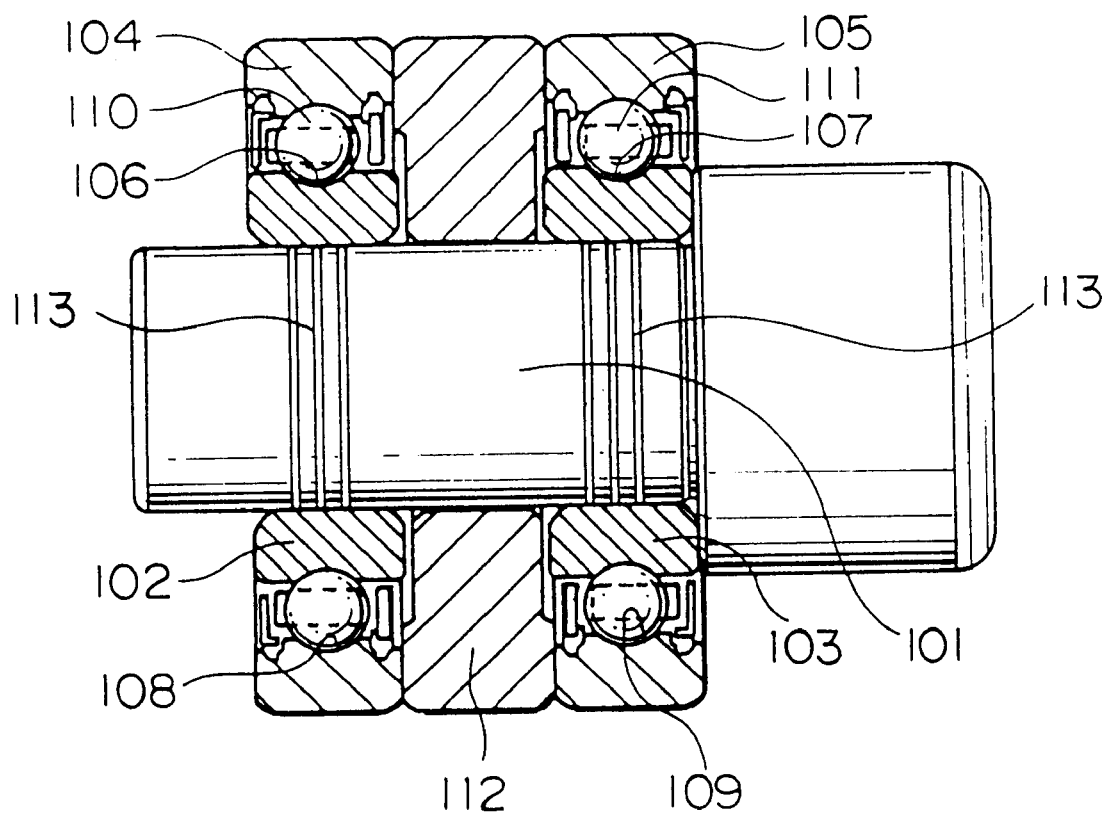
FIG. 1 is an axial cross sectional view of a conventional dual row bearing.
Figure 3:
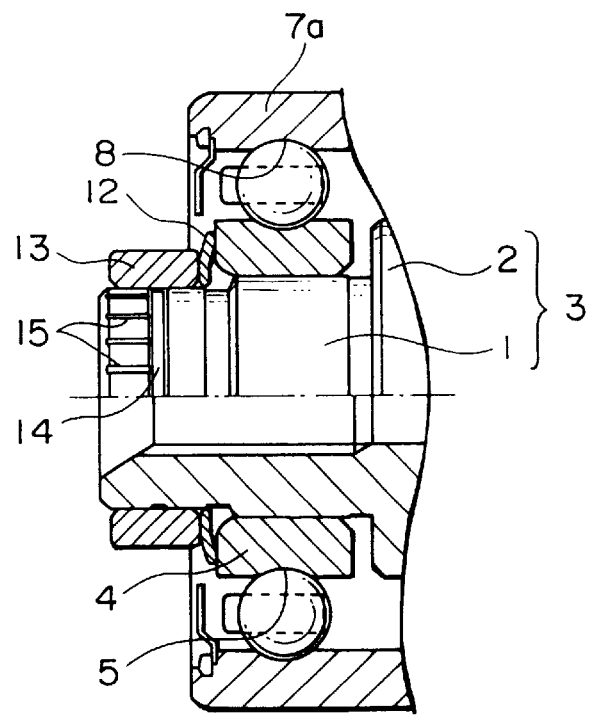
FIG. 3 is an axial cross sectional view of the main portion of another embodiment of a double row bearing with elastic means and a preloading collar.

FIG. 3 is an axial cross sectional view of the main portion of another embodiment of a double row bearing according to the present invention. A plurality of slots 15 are formed in the outer peripheral surface of the first cylindrical shaft portion so as to extend substantially axially from the annular groove to the free end face of the first cylindrical shaft portion 1 and to be arranged substantially equidistantly in a circumferential direction of the first cylindrical shaft portion 1. When the annular groove 14 is filled with the adhesive, the slots 15 are also filled with the same adhesive. This ensures stronger fixture of the preloading collar 13 to the first cylindrical shaft portion 1. The same parts and members in FIG. 2 as those in FIG. 1 are indicated by the same referential numerals as those in FIG. 1.

Figure 4:
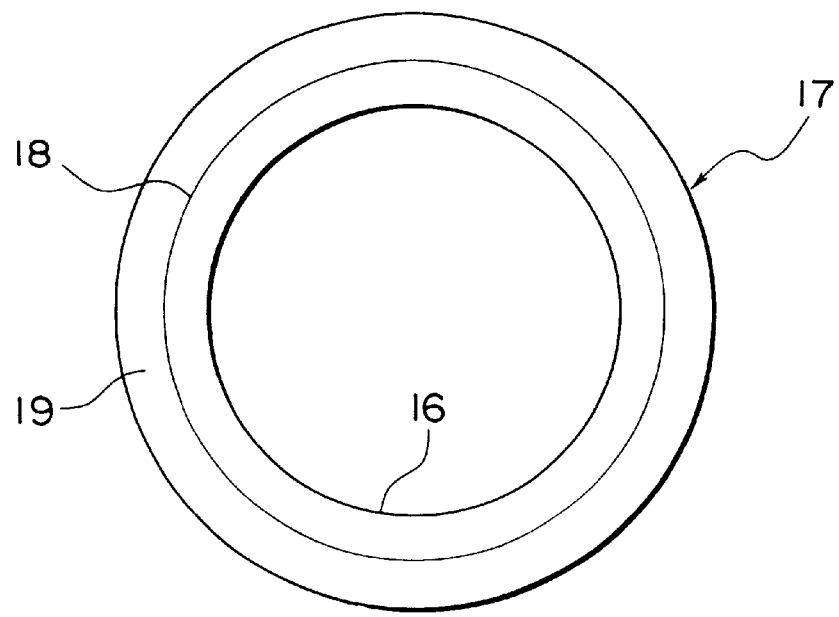
FIG. 4 is a plan view of a belleville spring used as one of elastic means in a double row bearing according to the present invention.

The elastic means 12 is embodied as a belleville spring 17 in FIG. 4 formed with a central hole 16 having a diameter substantially equal to or slightly larger than the outer diameter of the first cylindrical shaft portion 1. The belleville spring 17 has a circular bend portion 18 forming a circle having a diameter larger than that of the central hole 16. The annular outer portion 19 of the spring 17 which forms a portion outside of the circular bend portion 18 is inclined towards the inner ring 4 so that the circular outer edge of the outer portion 19 presses the end face of the inner ring 4 which is at the side of the free end face of the first cylindrical shaft portion 1.

Figure 5:
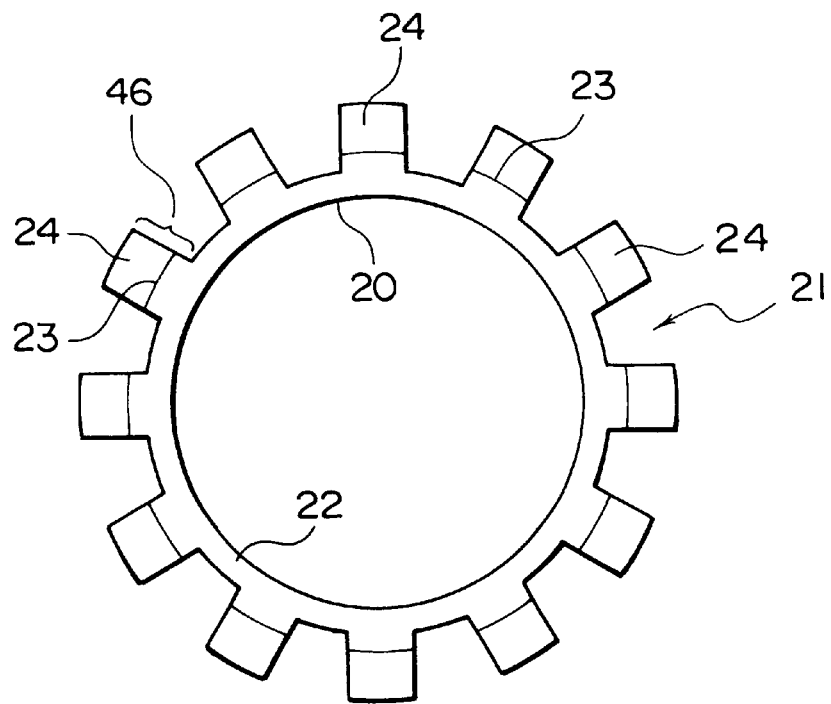
FIG. 5 is a plan view of a gear-shaped spring used as another elastic means in a double row bearing according to the present invention.

As another embodiment as shown in FIG. 5, the elastic means 12 comprises a gear-shaped spring 21 formed with a central hole 20 having a diameter substantially equal to or slightly larger than the outer diameter of the first cylindrical shaft portion 1. The gear-shaped spring 21 comprises an annular inner portion 22 and a plurality of tooth sections 46 extending radially outwardly from the circular outer periphery of the annular inner portion 22 and arranged in a circumferentially equidistantly spaced manner. A bend portion 23 is formed on the intermediate portion of each tooth section 46 between its outer edge and the outer periphery of the annular inner portion 22. The bend portions 23 are formed to assume an imaginary circle. The outer portion 24 of each tooth section 46 extending radially outwardly from the bend portion 23 is inclined towards the inner ring 4 so that the outer peripheral edge of each tooth section 46 presses the end face of the inner ring which is at the side of the free end face of the first cylindrical shaft portion 1.

It will be described how the double row bearings illustrated by FIGS. 2 to 5 according to the present invention act against the increase of temperature with reference to FIG. 6.

As the temperature rises, the outer ring 7 expands largely radially outward more than the inner ring 4 similarly in the case of the conventional double row bearing. However, the radial expansion of the balls 10 is smaller than the outer ring and the inner ring 4. If the elastic means 12 is not provided, pressing forces between the balls 10 and the first raceway surface 8 of the outer ring 7 and between the balls 10 and the second raceway surface 5 of the inner ring 4 decrease quickly. As a result, the preload applied to the bearing is reduced remarkably or in the worst case, the balls 10 are separated from the first raceway surface 8 and/or the second raceway surface 5 so that the preload is diminished in the same way as in the conventional double row bearing.

These disadvantages will be overcome in the present invention as follows. As the temperature increases, the outer ring 7 and the inner ring 4 expand outwardly largely and quickly as exaggeratedly shown in FIG. 6. The annular outer portion 19 (FIG. 4) and the outer portions 24 (FIG. 5) of the elastic means 12 are axially moved towards the inner ring 4 due to the elastic force of the elastic means 12 and press the inner ring 4 towards the second shaft portion 2. As a result, the urging force (biasing force) of the elastic means 12 (that is, the bellville spring 17 or the gear-shaped spring 21) moves the balls 10 from the position shown by solid lines to the position shown by two-dot chain lines at which the expanded balls 10 pressingly engage that portion of the first raceway surface 8 of the expanded outer ring 7 which is at the side of the second shaft portion 2 and that portion of the second raceway surface 5 of the expanded inner ring 4 which is at the side of the second shaft portion 2. Due to this movement of the elastic means 12, new mechanical balance is attained without reducing the preload abruptly, whereby constant operation of the bearing is ensured.

Since the inner ring 4 is axially slidable along the first shaft portion 1, the second raceway surface 5 of the inner ring 4 is not deformed unlike that inner ring of the conventional double row bearing which is bonded to the shaft. Thus, the roundness of the bearing during its operation can be substantially maintained at the accuracy of the bearing which has been just manufactured and has not yet been assembled to the shaft. This makes the assembly accuracy of the inner ring 4 to the first cylindrical shaft portion 1 very high and enhances the rotational accuracy of the bearing.

When an external load is exerted so as to reduce the space between the inner ring 4 and the preloading collar 13 in the double row bearing with the elastic means 12 (that is, the spring 17 or 21) as shown in FIG. 2 or FIG. 3 (that is, when an external load is applied to the bearing in the opposite direction to that of the preload), and/or when an external load is exerted on the shaft 3 in the same direction as that of the preload, the second raceway surface 5, the inner ring 4, the first raceway surface 8, the balls 10, the fourth raceway surface 6 and the shaft 3 are pressed in the direction of the preload by the preloading collar 13. At the same time, the preloading collar 13 is pushed in the opposite direction to that of the re-load by the inner ring 4.

Since these pushing actions are performed through the elastic means 12, that is, the spring 17 or 21, the outer portion 19 of the spring 17 or the outer portions 24 of the spring 21 cause spring-back in correspondence to the strength of the external load or the external loads, and the external load or the external loads are transferred to the preloading collar 13 and/or the inner ring 4 very gently. Further, the spring 17 or 21 absorbs a part of the external load or the external loads. Thus, the transferred load is reduced. In consequence, the double row bearing according to the present invention provides an advantage that abrupt load transfer (external load transfer) is avoided. As a result, excessively tight contact between the balls 10 and the raceway surfaces 5 and 8 and the excessively tight contact between the balls 11 and the raceway surfaces 6 and 9 do not occur. The balls 10 do not bite on the raceway surfaces 5 and/or 8, or the balls 11 do not bite on the raceway surfaces 6 and/or 9. Such a heavy load as makes the rotation of the bearing difficult or stops the rotation of the bearing is not applied to the bearing. Therefore, the preloading collar 13 is not likely be broken, or loosened or separated from the first cylindrical portion 1. Further, abrupt change of the external load or external loads is elastically reduced.

Let it be considered that an external load or external loads are applied in such a manner that the inner ring 4 and the preloading collar 13 are separated from each other (that is, an external load is applied to the bearing in the same direction as that of the preload and/or an external load is exerted on the shaft 3 in the opposite direction to that of the preload).

When such an external load or external loads are applied to the conventional double row bearing in this way, the preload applied to the bearing before the external load or the external loads (hereinafter referred to as "the original preload") are exerted is reduced quickly. When the external load or the external loads applied to the bearing exceed the original preload, the actual preload applied to the bearing is diminished and the bearing cannot be operated properly.

In the double row bearing according to the present invention, however, the springs 17 and 21 act in the following way. If the aforementioned external force or external forces were applied to the bearing, the preload applied from the preloading collar 13 to the inner ring 4 would be reduced. However, the spring 17 or 21 between the preloading collar 13 and the inner ring 4 pushes, at the outer portion 19 or the outer portions 24, that end face of the inner ring 4 which is at the side of the spring 17 or 21 against the external load or the external loads by the urging force of the outer portion 19 of the spring 17 or the outer portions 24 of the spring 21. Thus, reduction of the preload is compensated. In other words, the preload is prevented from being reduced or diminished in the following manner when such an external load or external loads are applied to the bearing.

Let it be considered that such a large external load or external loads are exerted on the bearing according to the present invention as would separate the preloading collar 13 from the inner ring 4 if the springs 17 and 21 did not exert elastic force on the inner ring 4 as mentioned above.

As the preloading collar 13 is separated from the inner ring 4 in the present invention, the outer portion 19 of the spring 17 bends at its circular bend portion 18 towards the inner ring 4 and the inner edge and the outer edge of the spring 17 elastically press the facing ends of the preloading collar 13 and the inner ring 4, respectively. Likewise, the outer portions 24 of the spring 21 bend at their bend portions 23 towards the inner ring 4, and the inner edge and the outer edges of the spring 23 elastically press the facing ends of the preloading collar 13 and the inner ring 4, respectively. Thus, a part of the preload is retained to push the inner ring 4 according to the degree of the space formed between the preloading collar 13 and the inner ring 4, as long as the outer portion 19 of the spring 17 or the outer portions 24 of the spring 21 press the inner ring 4. When the external load or the external loads repeatedly change, such change is damped by the elastic nature of the springs 17 and 21.

As described above, the double row bearing according to the present invention can be used as a bearing having both the primary function as a radial bearing and a secondary function as an axial bearing, this is, as a radial and axial bearing.

Figure 7:
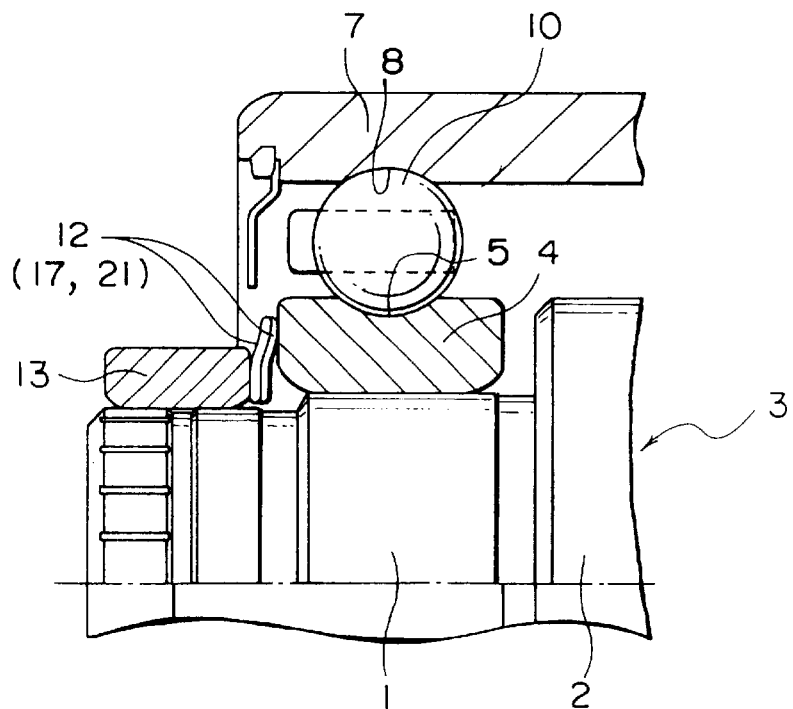
FIG. 7 is an axial cross sectional view of the main portion of a further embodiment according to the present invention with another elastic means.

FIG. 7 shows another embodiment of the double row bearing wherein the elastic means 12 comprises a plurality of belleville springs 17 each as shown in FIG. 4 or a plurality of gear-shaped springs 21 each as shown in FIG. 5. The springs 17 or 21 are coaxially arranged and contacted with one after another.

The elastic means 12 shown in FIG. 7 comprises two belleville springs each of which is similar to the belleville spring 17 as shown in FIG. 4 or two gear-shaped springs each of which is similar to the gear-shaped spring 14 as shown in FIG. 5. By selecting the number of the springs 17 or 21, a suitable preload to be applied to the bearing can be obtained and the suitable elastic coefficient of the elastic means 12 can be selected from a wide range of elastic coefficients, as well. Decrease of the preload due to the temperature rise is effectively prevented in the same way as in the case of the embodiment shown in FIG. 2. When an axial external load is applied to the bearing, such an external load gives small effect to the bearing. Thus, the bearing is operated very stably. The elastic means 12 is preferably made of elastic rubber. It is desirable that the elastic means 12 be annular.

The members and parts of the embodiment shown in FIG. 7 are designated by the same referential numerals as those of the embodiments shown in FIGS. 2 to 5. The assembly accuracy is maintained at such a high level as in the embodiments shown in FIGS. 2 to 5.

Figure 8:
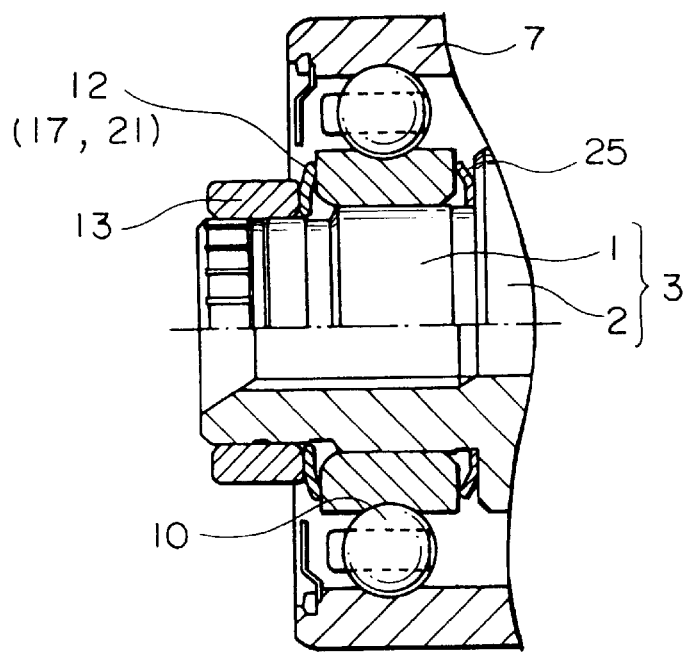
FIG. 8 is an axial cross sectional view of the main portion of a still further embodiment of the present invention.

FIG. 8 shows the main portion of a further embodiment of the double row bearing according to the present invention. Elastic means 25 having the same structure as the spring 17 of FIG. 4, the spring 21 of FIG. 5 or the springs (17 or 21) of FIG. 7 is provided between the preloading member 13 and the end face of the second shaft portion 2 at the side of the first shaft portion 1. The relation between the urging force (biasing force) of the spring means 12 when it is assembled to the bearing as shown in FIG. 8, the urging force (biasing force) of the elastic means 25 of the bearing when the elastic means 12 (the spring 17 or 21) when it is assembled to the bearing as shown in FIG. 8 and the actual preload applied to the bearing is such that the urging force of the elastic means 12 is larger than the actual preload applied to the inner ring 4 and such that the urging force of the elastic means 25 is the difference between the urging force of the elastic means 12 and the actual preload (that is, the urging force of the elastic means 12 minus the actual load ). When an external force is exerted on the bearing in any one of the axial directions in this structure, the preload is not remarkably reduced or diminished. Thus, a constantly stable operation of the bearing is ensured. Alternatively, the elastic means 12 can be made of elastic rubber. The members and parts of the embodiment shown in FIG. 8 are designated by the same referential numerals as those of the embodiments as shown in FIGS. 2 to 5.

When the temperature of the bearing changes, the variation of the preload actually acting on the double row bearing as shown in FIG. 8 is greatly compensated by the elastic means 12 comprising the spring 17 or the springs 21 or the elastic means 12 made of elastic rubber in the same way as in the embodiments as shown in FIGS. 2, 3 and 7. In other words, a predetermined preload characteristic can be maintained even if the temperature changes. Both high assembly accuracy and high operational characteristic are maintained similarly to the cases of the embodiments as shown in FIGS. 2, 3 and 7.

Alternately, the bearing can have a shorter first outer ring portion 26 surrounding the inner ring 4 and a longer second outer ring portion 27 coaxially with the first outer ring portion 26 and mounted on the second shaft portion 2, as shown in the upper portion of the outer ring 7 by broken lines in FIG. 2. Alternatively, the bearing can have a first outer ring portion 28 surrounding the inner ring 4, a second outer ring portion 29 coaxially with the first outer ring 28 and mounted on the second shaft portion 2 and an annular spacer 30 coaxially disposed between the first and second rings 28 and 29 so as to abut thereagainst, as shown in the lower portion of the outer ring 7 by broken lines in FIG. 2. The annular raceway surface 8 is formed in the inner peripheral surface of both outer ring portion 26 and outer ring 28 so as to radially face the annular raceway surface 5 of the inner ring 4. The outer rings 7 of FIGS. 3 and 6 to 8 can be similarly modified.

The length or width of the inner ring 4 can be made smaller than the length of the end portion 7a of the outer ring 7, the first outer ring 26 and the first outer ring 28 in such a manner that a space is formed between that end faces of the end portion 7a of the outer ring 7, the first outer ring 26 and the first outer ring 28 which are remoter from the second shaft portion 2 so that a part of the preloading collar 13 enters the space. This reduces the length of the bearing to miniaturize the bearing.

As shown in FIGS. 2, 3, 7 and 8, the shaft 3 has the first cylindrical shaft portion 1 and the second cylindrical shaft portion 2 having a larger diameter by the inner ring 4 than the first cylindrical shaft portion 1. Thus, no inner race is necessary between the other end portion 7b of the outer ring 7 and the second cylindrical shaft portion 2 or between the second outer ring 27 and the second cylindrical shaft portion 2. This reduces the number of the components of the bearing. The shaft 3 can be made thicker by twice the thickness of the inner ring 4 than the shaft of the conventional double row bearing, thereby enhancing the stability of the bearing.

Figure 9:
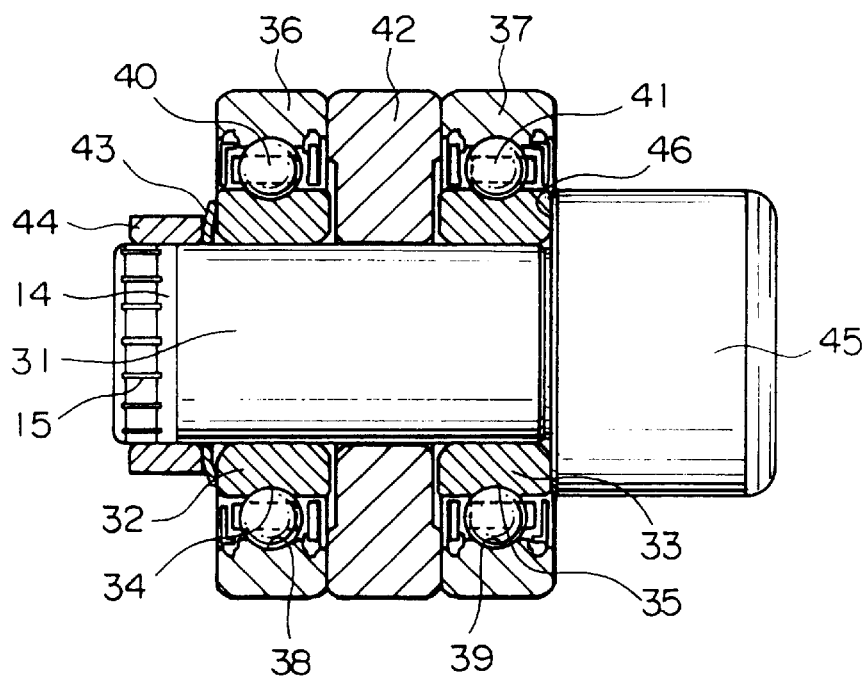
FIG. 9 is an axial cross sectional view of the main portion of a further embodiment of the present invention.

FIG. 9 shows a further embodiment of the dual row bearing according to the present invention which has a preloading collar 44 and elastic means 43 similar to the preloading collar 13 and the elastic means 12 of the embodiments of FIGS. 2, 3, 7 and 8, respectively.

The dual row bearing comprises a shaft 34, a first inner ring 32 and a second inner ring 33 having substantially the same size and substantially the same dimension as the first inner ring 32. The first and second inner rings 32 and 33 are coaxially mounted on the shaft 31 with a predetermined space provided therebetween. The first inner ring 32 is adapted to be movable along the shaft 31 but irrotational therearound. On the other hand, the second inner ring 33 is fixed to the shaft 31.

An annular raceway surface (the second raceway surface) 34 is formed in the outer peripheral surface of the first inner ring 32, and an annular raceway surface (third raceway surface) 35 is formed in the outer peripheral surface of the second inner ring 33. A first annular outer ring 36 and a second annular outer ring 37 having the same size as the first outer ring 36 coaxially surround the first and second inner rings 32 and 33, respectively.

The inner surface of the outer ring 36 is formed with an annular raceway surface (first raceway surface) 38 which radially faces the second raceway surface 34, and the inner surface of the outer ring 37 is also formed with an annular raceway surface (fourth raceway surface) 39 which radially faces the third raceway surface 35.

A row of rollable balls 40 are disposed between the first outer ring 36 and the first inner ring 32 to be received by the first and second raceway surfaces 38 and 34 and arranged circumferentially thereof. Likewise, another roll of rollable balls 41 are disposed between the second outer ring 37 and the second inner ring 33 to be received by the fourth and third raceway surfaces 39 and 35 and arranged circumferentially thereof. An annular space 42 surrounds the shaft 31 between the first and second outer rings 36 and 37 with both end faces of the spacer 42 abutting against the corresponding end faces of the first and the second outer rings 36 and 37. The spacer 42 has a central hole having a larger diameter than the outer diameter of the shaft 31 so as not to be contacted therewith. The portions of both end faces of the spacer 42 which face the first and second inner rings 32 and 33 are recessed in such a manner that these portions are not in contact with these inner rings 32 and 33. Thus, the spacer 42 does not interfere with the shaft 31 or the inner rings 32 and 33 during the operation of the bearing.

Figure 6:
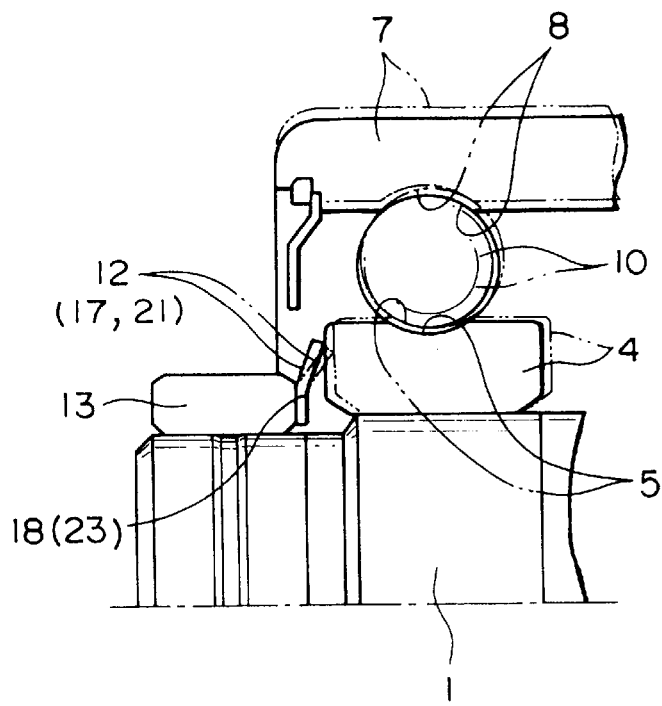
FIG. 6 is an axial cross sectional view illustrating action of the double row bearings of FIGS. 1 to 4 against the rise of temperature.

Elastic means 43 having the same structure as the elastic means 12 comprising a belleville spring 17 as shown in FIG. 4, a gear-shaped spring 21 as shown in FIG. 5 or double springs as shown in FIG. 6 is mounted on the shaft 31 from its end at the side of the first inner ring 32. Further, an annular preloading collar 44 is mounted on the shaft 31 from its end at the side of the first inner ring 32 and moved towards the second inner ring 33 until the preloading collar 44 applies a predetermined preload to the first inner ring 32 through the elastic means 43. An annular groove 14 similar to that shown in FIG. 2 or 6 or combination of an annular groove 14 and axial slots 15 similar to those shown in FIG. 3, 7 or 8 is formed in the area of the outer peripheral surface of the shaft 31 on which the preloading collar 44 is mounted. The groove 14 and the slots 15 are filled with adhesive in the same way as those as shown in FIGS. 2, 3, 6, 7 and 8. Finally, the preloading collar 44 is fixed to the shaft 31.

A cylindrical diameter-increased portion 45 is integrally and coaxially formed on the other end of the shaft 31. The end face of the diameter-increased portion 45 which is at the side of the shaft 31 abuts against the end face of the second inner ring 33 at the side of the diameter-increased portion 45 so that the second inner ring 33 is retained in a predetermined position with respect to the shaft 31 even if the preload changes.

Alternatively, the elastic means 43 can be made of plastic rubber.

The double row bearing as shown in FIG. 9 acts against the change in preload, the change in temperature and axial movement of the bearing similarly to the double row bearings as shown in FIGS. 2, 3, 6, 7 and 8.

In the double row bearing according to the present invention, the sleeve-shaped outer ring 7, the combination of the first outer ring 26 and the second outer ring 27 and the combination of the first outer ring 28, the second outer ring 29 and the spacer 30 as shown in FIGS. 2, 3, 6 and 8, and the combination of the first outer ring 36, the second outer ring 37 and the spacer 42 as shown in FIG. 9 constitute outer ring means. The preloading collars 13 and 44 can be threadably connected to the shafts 3 and 31, respectively. Preferably, the inner rings, the outer rings, the preloading spaces and the balls are made of bearing steel.

The double row bearing according to the present invention can be of any type of the double row bearings. In particular, it is suited to be used as a double row bearing for such a precision instrument as a hard disc drive unit, a polygon mirror and a pivot assembly.

What is claimed is:

1. A double row bearing, on which an inner ring is applied with given preload by a preloading member through an elastic member, said double row bearing comprising:
   a shaft having an outer peripheral surface;
   outer ring means coaxially surrounding said shaft and relatively rotatable therearound, said outer ring means including a first end portion and a second end portion, at least said first end portion having an inner peripheral surface coaxial with said shaft;
   a first annular raceway surface formed in said inner peripheral surface of said first end portion of said outer ring means;
   an annular inner ring surrounding said shaft between said shaft and said first portion of said outer ring means, said annular inner ring having an outer peripheral surface;
   a second annular raceway surface formed in said outer peripheral surface of said annular inner ring so as to radially face said first raceway surface; and
   a row of circumferentially arranged balls received by said first and second raceway surfaces;
   wherein said preloading member is mounted on said shaft at said first end portion of said outer ring means;
   wherein said elastic member is provided between said annular inner ring and said preloading member; and
   wherein said annular inner ring is slidably engaged with said shaft, and said preloading member is fixed to said shaft in a position in which said preloading member presses said elastic means towards said annular inner ring to apply a predetermined preload to said annular inner ring through said elastic member.

2. A double row bearing comprising:
   a shaft having an outer peripheral surface;
   outer ring means coaxially surrounding said shaft and relatively rotatable therearound, said outer ring means including a first end portion and a second end portion, at least said first end portion having an inner peripheral surface coaxial with said shaft;
   a first annular raceway surface formed in said inner peripheral surface of said first end portion of said outer ring means;
   an annular inner ring surrounding said shaft between said shaft and said first portion of said outer ring means, said annular inner ring having an outer peripheral surface;
   a second annular raceway surface formed in said outer peripheral surface of said annular inner ring so as to radially face said first raceway surface;
   a row of circumferentially arranged balls received by said first and second raceway surfaces;
   a preloading member mounted on said shaft at said first end portion of said outer ring means; and
   elastic means provided between said inner ring and said reloading member;
   wherein said preloading member is adhesively fixed to said shaft in a position in which said preloading member presses said elastic means towards said annular inner ring to apply a predetermined preload to said annular inner ring through said elastic means; and
   wherein said preloading member is bonded to said shaft.

3. The double row bearing according to claim 2, wherein an annular groove filled with adhesive is formed in said outer peripheral surface of said shaft.

4. The double row bearing according to claim 2, wherein said preloading member has an inner peripheral surface, and said outer peripheral surface has an area corresponding to said inner peripheral surface of said preloading member, and wherein axial slots filled with adhesive are formed in said area of said outer peripheral surface of said shaft and arranged so as to be separated circumferentially with respect to said shaft.

5. A double row bearing comprising:
   a shaft having an outer peripheral surface;
   outer ring means coaxially surrounding said shaft and relatively rotatable therearound, said outer ring means including a first end portion and a second end portion, at least said first end portion having an inner peripheral surface coaxial with said shaft;
   a first annular raceway surface formed in said inner peripheral surface of said first end portion of said outer ring means;
   an annular inner ring surrounding said shaft between said shaft and said first portion of said outer ring means, said annular inner ring having an outer peripheral surface;
   a second annular raceway surface formed in said outer peripheral surface of said annular inner ring so as to radially face said first raceway surface;
   a row of circumferentially arranged balls received by said first and second raceway surfaces;
   a preloading member mounted on said shaft at said first end portion of said outer ring means; and
   elastic means provided between said inner ring and said reloading member;
   wherein said preloading member is adhesively fixed to said shaft in a position in which said preloading member presses said elastic means towards said annular inner ring to apply a predetermined preload to said annular inner ring through said elastic means;
   wherein said inner peripheral surface of said first end portion of said outer ring means has a diameter;
   wherein said second end portion of said outer ring means has an inner peripheral surface having a diameter substantially equal to said diameter of said inner peripheral surface of said first end portion of said outer ring means;
   wherein said shaft comprises a first cylindrical shaft portion inserted into said annular inner ring and a second cylindrical shaft portion formed integrally and coaxially with said first shaft portion and having an outer diameter substantially equal to said diameter of said inner peripheral surface of said second end portion of said outer ring means;

wherein a third annular raceway surface is formed in said inner peripheral surface of said second end portion of said outer ring means;

wherein a fourth annular raceway surface is formed in an outer peripheral surface of said second shaft portion so as to radially face said third annular raceway surface; and wherein another row of circumferentially arranged balls are disposed between said second end portion of said outer ring means and said second shaft portion so as to be received by said third and fourth annular raceway surfaces.

6. The double row bearing according to claim 5, wherein:

said first end portion of said outer ring means comprises a first outer ring;

said second end portion of said outer ring means comprises a second outer ring; and a sleeve-shaped spacer surrounds said shaft and is disposed between said first and second outer rings to abut thereagainst.

7. The double row bearing according to claim 5, wherein:

said second shaft portion has one end facing said annular inner ring;

another elastic means is provided between said one end of said second shaft portion and said annular inner ring, for applying another urging force to said annular inner ring; and said preloading member is fixed to said first shaft portion in a position in which said predetermined preload is substantially equal to said urging force applied by said elastic means to said annular inner ring minus said another urging force applied by said another elastic means to said annular inner ring.

8. The double row bearing according to claim 7, wherein:

said first end portion of said outer ring means comprises a first outer ring;

said second end portion of said outer ring means comprises a second outer ring; and a sleeve-shaped spacer surrounds said shaft and is disposed between said first and second outer rings so as to abut thereagainst.

9. The double row bearing according to claim 8, wherein said annular inner ring is narrower than said first outer ring.

10. A double row bearing comprising:

a shaft having an outer peripheral surface;

outer ring means coaxially surrounding said shaft and relatively rotatable therearound, said outer ring means including a first end portion and a second end portion, at least said first end portion having an inner peripheral surface coaxial with said shaft;

a first annular raceway surface formed in said inner peripheral surface of said first end portion of said outer ring means;

an annular inner ring surrounding said shaft between said shaft and said first portion of said outer ring means, said annular inner ring having an outer peripheral surface;

a second annular raceway surface formed in said outer peripheral surface of said annular inner ring so as to radially face said first raceway surface;

a row of circumferentially arranged balls received by said first and second raceway surfaces;

a preloading member mounted on said shaft at said first end portion of said outer ring means; and elastic means provided between said inner ring and said reloading member;

wherein said preloading member is adhesively fixed to said shaft in a position in which said preloading member presses said elastic means towards said annular inner ring to apply a predetermined preload to said annular inner ring through said elastic means; and wherein said first end portion of said outer ring means comprises a first outer ring with which said row of balls engage, and the second end portion of said outer ring means comprises a second outer ring coaxially surrounding said shaft and abutting against said first outer ring.

11. The double row bearing according to claim 10, wherein said annular inner ring is narrower than said first outer ring.

12. A double row bearing comprising:

a shaft having an outer peripheral surface;

outer ring means coaxially surrounding said shaft and relatively rotatable therearound, said outer ring means including a first end portion and a second end portion, at least said first end portion having an inner peripheral surface coaxial with said shaft;

a first annular raceway surface formed in said inner peripheral surface of said first end portion of said outer ring means;

an annular inner ring surrounding said shaft between said shaft and said first portion of said outer ring means, said annular inner ring having an outer peripheral surface;

a second annular raceway surface formed in said outer peripheral surface of said annular inner ring so as to radially face said first raceway surface;

a row of circumferentially arranged balls received by said first and second raceway surfaces;

a preloading member mounted on said shaft at said first end portion of said outer ring means; and elastic means provided between said inner ring and said reloading member;

wherein said preloading member is adhesively fixed to said shaft in a position in which said preloading member presses said elastic means towards said annular inner ring to apply a predetermined preload to said annular inner ring through said elastic means;

wherein said outer ring means comprises a first outer ring coaxially surrounding said annular inner ring, a second outer ring having an inner peripheral surface, and an annular spacer surrounding said shaft and disposed between said first and second outer rings in abutment thereagainst;

a third annular raceway surface is formed in said inner peripheral surface of said second outer ring;

a fourth annular raceway surface is formed in said outer peripheral surface of said annular inner ring so as to radially face said third annular raceway surface of said second outer ring; and a row of rollable balls are disposed between said second outer ring and said annular inner ring and received by said third and fourth raceway surfaces of said second outer ring and said annular inner ring so as to rotate circumferentially with respect thereto.

* * * * *